US005496968A

United States Patent [19]

Katoh et al.

[11] Patent Number: 5,496,968

[45] Date of Patent: Mar. 5, 1996

[54] SHIELDED CABLE CONNECTING TERMINAL

[75] Inventors: Hisaharu Katoh; Hirotaka Fukushima, both of Shizuoka, Japan

[73] Assignee: Yazaki Corporation, Japan

[21] Appl. No.: 234,924

[22] Filed: Apr. 28, 1994

[30] Foreign Application Priority Data

Apr. 30, 1993 [JP] Japan .................................... 5-103998

[51] Int. Cl.$^{6}$ ...................................................... H02G 15/02

[52] U.S. Cl. .......................... 174/74 R; 174/19; 439/877; 439/879

[58] Field of Search ................................ 174/74 R, 74 A, 174/19, 82, 83; 439/135, 877, 879, 610

[56] References Cited

U.S. PATENT DOCUMENTS

| | | | |
|---|---|---|---|
| 2,815,497 | 12/1957 | Redslob . | |
| 3,102,766 | 9/1963 | Hood . | |
| 3,141,924 | 7/1964 | Forney, Jr. | 174/75 C |
| 3,221,290 | 11/1965 | Stark et al. . | |
| 4,689,440 | 8/1987 | Morin | 174/75 C |
| 5,214,243 | 5/1993 | Johnson | 174/74 R |
| 5,295,868 | 3/1994 | Viaud et al. | 174/74 R |

FOREIGN PATENT DOCUMENTS

| | | |
|---|---|---|
| 53-1687 | 1/1978 | Japan . |

*Primary Examiner*—Morris H. Nimmo
*Attorney, Agent, or Firm*—Venable, Baetjer, Howard & Civiletti

[57] ABSTRACT

A shielded cable connecting terminal includes a conductor, a cable sheath insulating the conductor, and a conductive braid wound around the cable sheath. The terminal further comprises: a terminal body having an electrically connecting portion connectable to a mating terminal at one end and a cylindrical portion connectable to the end of the shielded cable at the other end; and a conductive pipe for receiving the conductor of the shielded cable therein and fitting into the cylindrical portion. A collar is disposed on the conductive pipe into which the shielded cable is inserted and an insulating portion is formed on the edge surface of the collar. As a result, short-circuiting caused by possible contact between fraying strands of the braid of the shielded cable and the terminal is avoided. Further, the use of the inexpensive conductive pipe lowers the overall cost of the terminal.

11 Claims, 2 Drawing Sheets

SHIELDED CABLE CONNECTING TERMINAL

BACKGROUND OF THE INVENTION

1. Field of the Invention

The present invention relates to a shielded cable connecting terminal, and more particularly, to a terminal which is capable of avoiding contact with a braid wound around the outside of the shielded cable when it is connected to the end of the shielded cable so as to prevent a yield of current. The invention is also capable of connecting shielded cables of various sizes.

2. Description of the Related Art

A shielded cable comprises a conductor, a cable sheath insulating the conductor and a net-like conductive braid wound around the outside of the cable sheath. The braid includes fraying strands at the end thereof. The shielded cable connecting female terminal comprises an electrically connecting portion at one end for receiving a male terminal and a cable pressing portion at the other end for connecting the conductor of the shielded cable thereto and a sheath clamping portion for clamping the cable sheath.

When the end of the shielded cable is connected to the female terminal, the fraying strands at the end of the braid is brought into contact with the female terminal, thereby increasing the possibility of short-circuiting the current.

Also, because of the varied diameters of the shielded cable conductors connectable to the female terminals, either of the following measures has to be taken. The female terminal must be manufactured depending upon the size of the shielded cable. Alternatively, a separate part adapted to the size of the conductor must be prepared in advance and the resulting conductor built-in separate part must be inserted into the female terminal.

For the use of such a separate part, a screw hole is provided for the end of the female terminal and the separate part, that is, a connecting member is provided with a male screw fit into the screw hole and a cable-receiving hole having an inner diameter compatible with the size of the cable conductor.

The above method encounters the problem that the connecting member is lengthened and extra components such as a mold, or the like, are required according to the number of separate parts, thus increasing the cost of manufacturing the connecting member.

SUMMARY OF THE INVENTION

Accordingly, an object of the present invention is to provide a shielded cable connecting terminal free from the danger of short-circuiting caused by bringing a braid of a shielded cable into contact with a terminal.

Another object of the present invention is to provide a shielded cable connecting terminal which permits lowering the cost of manufacturing separate parts such as a connecting member, or the like.

In order to achieve the above objects, the present invention provides a shielded cable connecting terminal comprising: a terminal body having an electrically connecting portion connectable to a mating terminal at one end and a cylindrical crimping portion connectable to the end of the shielded cable at the other end; and a conductive pipe receiving the end of the shielded cable therein and fitting into the crimping portion, the conductive pipe having a collar around one end thereof and an insulating portion formed at the edge surface of the collar. When the conductor of the shielded cable is inserted into the conductive pipe, the insulating portion prevents connection between the braid of the shielded cable and the terminal.

The insulating portion may preferably formed of an insulating paint.

According to the shielded cable connecting terminal constructed as described above, a connecting member can be manufactured by a simply constructed conductive pipe, thus lowering the overall cost of manufacturing the terminal.

For connecting the shielded cable to the terminal, after the cable is fit into the conductive pipe adjacent to the collar which pipe is then inserted into the crimping portion of the terminal, both crimping portion and the conductive pipe are caulked so that they are pressed against the cable.

During insertion, even though the fraying strands of the braid of the shielded cable contact the collar, there is no danger of short-circuiting both components since the insulating material is formed on the edge surface of the collar.

Other objects, features and advantages of the present invention will become apparent from the following detailed description of the invention in conjunction with the accompanying drawings.

DESCRIPTION OF THE PREFERRED EMBODIMENT

Figure 1:
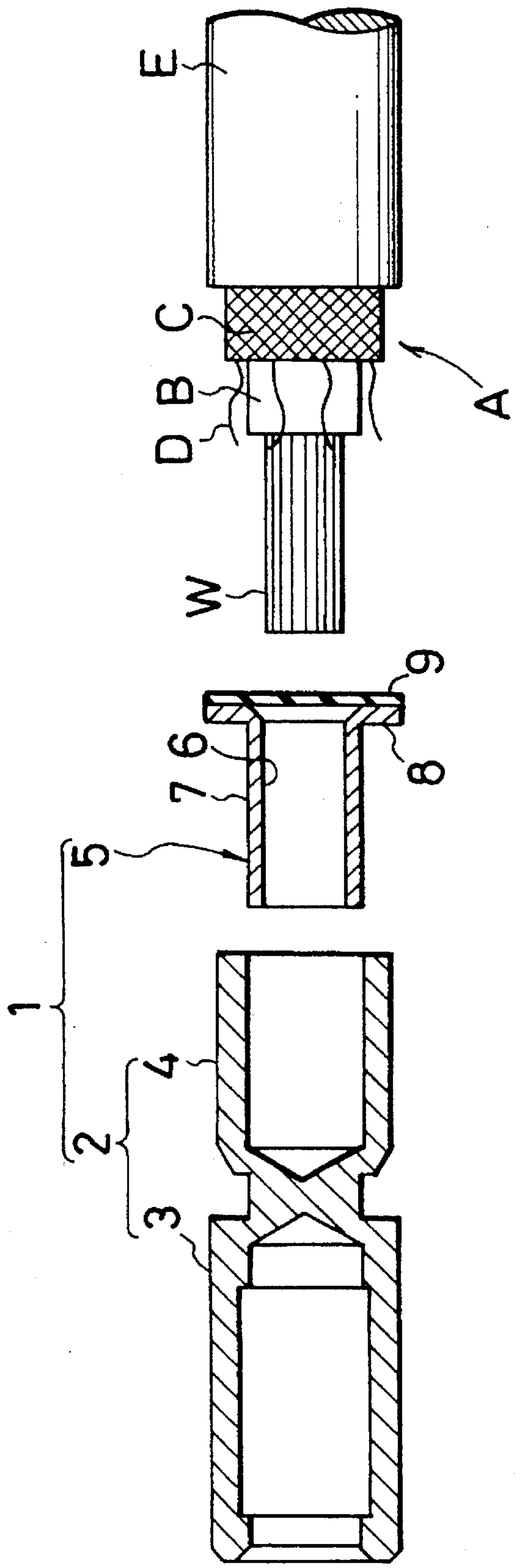
FIG. 1 is a sectional view of components constituting an embodiment of a shielded cable connecting terminal according to the present invention and is also a front view of an essential portion of the shielded cable connectable to the shielded cable connecting terminal.

FIG. 1 is a sectional view of components constituting a shielded cable connecting terminal 1 according to the present invention and is also a front view of an essential portion of a shielded cable generally denoted by A connectable to the shielded cable connecting terminal 1.

The shielded cable A comprises a conductor W, a shielded cable sheath B insulating the conductor W, a net-like conductive braid C wound around the shielded cable sheath B, and an external sheath E the braid C. Fraying strands D are produced at the end of the braid C.

The shielded cable connecting terminal 1 for connection with the shielded cable A comprises: a terminal body 2 having an electrically connecting portion 3 for receiving a mating terminal at one end (on the left hand of FIG. 1) and a cylindrical crimping portion 4 at the other end; and a conductive pipe 5 having an inner diameter in the form of an inner peripheral surface 6 for receiving the conductor W of the shielded cable A and an outer diameter in the form of an outer peripheral surface 7 which can be inserted into the caulking portion 4.

Figure 2:
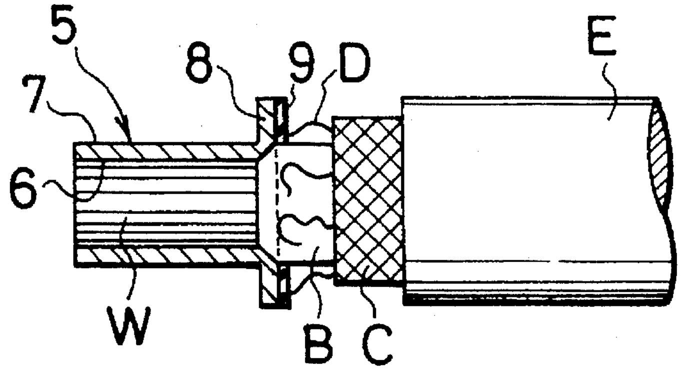
FIG. 2 is a longitudinal sectional view of the shielded cable being inserted into a conductive pipe shown in FIG. 1.
Figure 3:
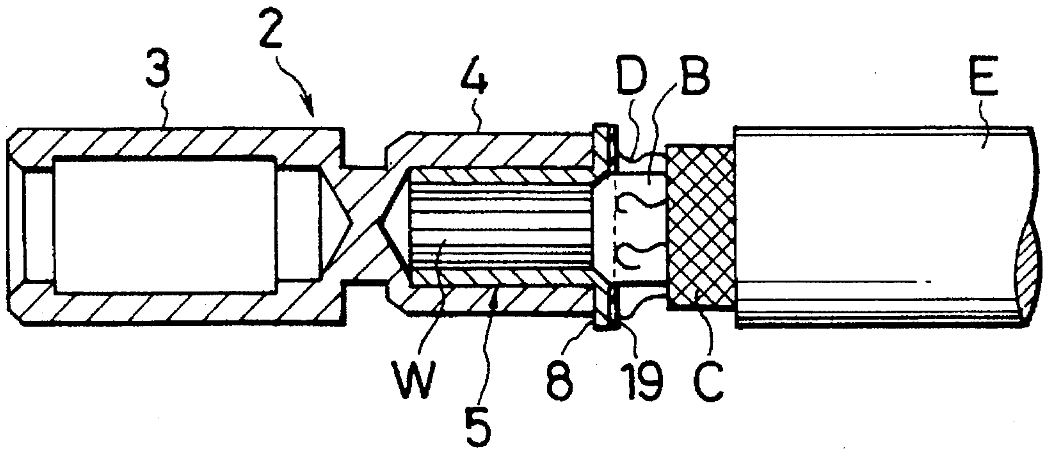
FIG. 3 is a front view of the shielded cable connecting terminal received and pressed against the shielded cable.

The conductive pipe 5 is formed of, for example, copper. A collar 8 is disposed at the end of the conductive pipe 5 for receiving the cable and an insulating material 9 is further attached to the edge of the collar 8. The insulating material 9 may be an insulating paint applied to the collar 8, as shown in FIG. 2, or alternatively, a cover 19 formed of plastic, or the like, may be fixed to the collar 8, as illustrated in FIG. 3. The conductive pipe 5 is produced compatible with the size of the shielded cable A wherein the inner diameter of the inner peripheral surface 6 is slightly greater than the external shape of a bundle of the conductor W of the shielded cable A and the outer diameter of the outer peripheral surface 7 is slightly smaller than the inner diameter of the crimping portion 4 of the terminal body 2.

Accordingly, the smaller the outer diameter of a bundle of the conductor W, the greater the thickness of the conductive pipe 5. The use of similar materials forming the conductive pipe 5 and the conductor W offers the following advantage. Even though the size of the outer diameter of the conductor W may vary, a crimping operation can be performed with the same clamping force and substantially uniform compressibility, thus advantageously stabilizing the quality of the crimped product.

A description will be given of the operation of connecting the shielded cable A by use of the shielded cable connecting terminal constructed as described above with reference to FIGS. 2 and 3.

For connecting the end of the shielded cable A with the shielded cable connecting terminal 1, the external sheath E, the braid C and the cable sheath B are stripped as shown in FIG. 1 and then the conductor W is inserted into the conductive pipe 5 (See FIG. 2).

During this insertion, the fraying strands D at the end of the braid C might be in contact with the collar 8. Since the insulating material 9 is formed at the end of the collar 8, there is no danger of electric short-circuiting.

Subsequently, the conductive pipe 5 is inserted into the caulking portion 4 the outside of which is then clampingly pressurized by an instrument so that the caulking portion 4 and the conductive pipe 5 are plastic-deformed substantially into a flattened or polygonal shape, thereby pressing both components against the conductor W.

During this operation, even though the size of the outer diameter of the conductor W may vary, a caulking operation can be performed with the same clamping force and substantially uniform compressibility, thus advantageously stabilizing the quality of the crimped product.

The conductive pipe 5 is simple in construction and thus inexpensive to be produced.

As will be clearly understood from the foregoing description, the present invention offers the following advantages.

(1) The shielded cable connecting terminal of the present invention solves the conventional problem of the danger of short-circuiting caused by bringing the fraying strands at the end of the braid into contact with the terminal when the shielded cable is connected to the terminal.

(2) Even though the size of the cable may vary, the caulking operation can be performed with the same clamping force and substantially uniform compressibility, thus stabilizing the quality of the crimped product.

(3) The conductive pipe is simply constructed such that a collar is disposed at the end of a copper pipe, or the like, so that it can be low in cost. Further, an insulating material is easily formed at the end of the collar by such means as painting or fixing, thus lowering the overall cost of the shielded cable connecting terminal.

What is claimed is:

1. A terminal for connecting shielded cable including a conductor, a cable sheath insulating said conductor, and a conductive braid wound around said cable sheath, said terminal comprising:

a terminal body having an electrically connecting portion connectable to a mating terminal at one end and a cylindrical portion connectable to the end of said shielded cable at the other end; and a conductive pipe for receiving said conductor of said shielded cable therein and fitting into said cylindrical portion, said conductive pipe having an insulating portion formed at the peripheral edge into which said shielded cable is to be inserted.

2. A terminal according to claim 1, wherein a collar is fit around one end of said conductive pipe into which said shielded cable is to be inserted and an insulating portion is formed on said collar.

3. A terminal according to claim 2, wherein said insulating portion is formed of an insulating paint applied to the edge surface of said collar.

4. A terminal according to claim 2, wherein said insulating portion is formed of a plastic cover fixed to said collar.

5. A terminal according to claim 1, wherein said cylindrical portion is externally crimped, thereby pressing said conductive pipe against said conductor of said shielded cable when said shielded cable is inserted into said conductive pipe.

6. A terminal according to claim 1, wherein said conductive pipe is formed of copper.

7. A terminal for connecting shielded cable including a conductor, a cable sheath insulating said conductor, and a conductive braid wound around said cable sheath, said terminal comprising:

a terminal body having an electrically connecting portion connectable to a mating terminal at one end and a cylindrical portion connectable to the end of said shielded cable at the other end; and a conductive pipe in which the inner diameter of the inner peripheral surface is slightly greater than the outer diameter of said conductor of said shielded cable and the outer diameter of the outer peripheral surface is slightly smaller than the inner diameter of said cylindrical portion of said terminal, said conductive pipe receiving said conductor of said shielded cable therein and fitting into said cylindrical portion of said terminal, said conductive pipe being crimped from the outside of said cylindrical portion so as to be pressed against said conductor of said shielded cable when said shielded cable is inserted into said conductive pipe, said conductive pipe having a collar around one end into which said shielded cable is inserted and having an insulating portion formed at the edge of said collar, said insulating portion preventing contact between said braid of said shielded cable and said cable connecting terminal when said conductor of said shielded cable is inserted into said conductive pipe.

8. A terminal according to claim 7, wherein said insulating portion is formed of an insulating paint applied to the edge surface of said collar.

9. A terminal according to claim 7, wherein said insulating portion is formed of a plastic cover fixed to said collar.

10. A terminal according to claim 7, wherein said conductor of said shielded cable is formed of a material similar to that of said conductive pipe.

11. A terminal according to claim 7, wherein said conductive pipe is formed of copper.

* * * * *